(12) United States Patent
Miyata et al.

(10) Patent No.: US 6,540,848 B2
(45) Date of Patent: Apr. 1, 2003

(54) HIGH STRENGTH, HIGH TOUGHNESS, SEAMLESS STEEL PIPE FOR LINE PIPE

(75) Inventors: Yukio Miyata, Aichi (JP); Mitsuo Kimura, Aichi (JP); Takaaki Toyooka, Aichi (JP); Noritsugu Itakura, Aichi (JP)

(73) Assignee: Kawasaki Steel Corporation (JP)

( * ) Notice: Subject to any disclaimer, the term of this patent is extended or adjusted under 35 U.S.C. 154(b) by 21 days.

(21) Appl. No.: 09/914,503

(22) PCT Filed: Jan. 26, 2001

(86) PCT No.: PCT/JP01/00505

§ 371 (c)(1),
(2), (4) Date: Aug. 29, 2001

(87) PCT Pub. No.: WO01/57286

PCT Pub. Date: Aug. 9, 2001

(65) Prior Publication Data

US 2002/0170637 A1 Nov. 21, 2002

(30) Foreign Application Priority Data

Feb. 2, 2000 (JP) ......................................... 2000-025158

(51) Int. Cl.⁷ ......................... C22C 38/12; C22C 38/15; C22C 38/08; C22C 38/04; C21D 8/10
(52) U.S. Cl. ...................... 148/336; 148/593; 420/119; 420/124
(58) Field of Search ................................ 420/119, 124; 148/336, 593

(56) References Cited

U.S. PATENT DOCUMENTS 4,210,445 A * 7/1980 Kasamatsu et al. ......... 420/104
6,183,573 B1 * 2/2001 Fujiwara et al. ............ 148/336

FOREIGN PATENT DOCUMENTS

| EP | 0 828 007 A1 | 3/1998 |
| EP | 0 842 715 A1 | 5/1998 |
| JP | 9-111343 | 4/1997 |
| JP | 9-235617 | 9/1997 |
| WO | WO 98/38345 | 9/1998 |
| WO | WO 99/05334 | 2/1999 |

OTHER PUBLICATIONS

J. R. Davis: "Carbon and Alloy Steels", Mar. 1996, ASM International, USA XP002214646, pp. 644–653.

* cited by examiner

*Primary Examiner*—Deborah Yee
(74) *Attorney, Agent, or Firm*—Schnader Harrison Segal & Lewis LLP

(57) ABSTRACT

A high-strength, high-toughness seamless steel pipe used for a line pipe contains 0.03 to 0.06% of C, 0.05 to 0.15% of Si, 1.6 to 2.0% of Mn, 0.010 to 0.10% of Al, 0.3 to 0.7% of Ni, 0.10 to 0.40% of Mo, 0.01 to 0.06% of V, 0.003 to 0.03% of Nb, 0.003 to 0.020% of Ti, and 0.0010 to 0.0100% of N, the relationships $Mo+5V \geq 0.4\%$ and $2Nb-V \leq 0\%$ being satisfied, and the balance being Fe and incidental impurities. Consequently, it is possible to provide the high-strength, high-toughness seamless steel pipe used for a line pipe in which grade X80 strength and toughness are stably ensured, and the target strength can be easily attained regardless of the size.

7 Claims, No Drawings

HIGH STRENGTH, HIGH TOUGHNESS, SEAMLESS STEEL PIPE FOR LINE PIPE

TECHNICAL FIELD

The present invention relates to high-strength, high-toughness seamless steel pipes used for line pipes, and more particularly, the invention relates to a high-strength, high-toughness seamless steel pipe used for a grade X80 line pipe according to the API-5L and to a method for producing the same.

BACKGROUND ART

Grade X80 seamless steel pipes have been developed for pipelines and risers used for transporting crude oil and natural gas. In order to secure grade X80 strength (YS: 551 MPa or more, TS: 620 to 827 MPa), heat treatment is usually carried out either by:

1) so-called "reheating quenching-tempering" (RQ-T) in which cooling is performed after seamless steel pipes are produced, and then reheating, quenching, and tempering are performed, or by
2) so-called "direct quenching-tempering" (DQ-T) in which quenching is performed directly after seamless steel pipes are produced, followed by tempering.

Pipes are joined together by welding. In order to secure weldability, the C content must be reduced. In order to secure sufficient hardenability of low C steel, appropriate amounts of various alloy elements must be added thereto.

It is known that the addition of a slight amount of B is effective in improving hardenability of low C steel. However, B has a side effect, namely, B adversely affects toughness of welded joints. Moreover, since the effect is greatly influenced by the contents of precipitation generating elements, such as N and Ti, it is difficult to stably ensure toughness by the addition of a slight amount of B. Additionally, in the present invention, the target toughness is set at a vTrs (50% fracture appearance transition temperature) of $-60°$ C. or less in the base metal and at a vTrs of $-40°$ C. or less in the HAZ (Heat Affected Zone at the welded joint).

Since the hardenability greatly depends on the size of the steel pipe, in order to secure stable strength for each size, tempering conditions must be adjusted for each size. However, with respect to conventional seamless steel pipes, since the resistance to temper softening is excessively large, it is difficult to stably ensure the strength unless the chemical composition is changed for each size.

Accordingly, it is an object of the present invention to provide a high-strength, high-toughness seamless steel pipe used for a line pipe in which X80 grade strength and toughness can be stably ensured, and the target strength can be easily attained regardless of the size.

DISCLOSURE OF INVENTION

In one aspect of the present invention which has been made in order to achieve the object described above, a high-strength, high-toughness seamless steel pipe used for a line pipe contains 0.03 to 0.06% of C, 0.05 to 0.15% of Si, 1.6 to 2.0% of Mn, 0.010 to 0.10% of Al, 0.3 to 0.7% of Ni, 0.10 to 0.40% of Mo, 0.01 to 0.06% of V, 0.003 to 0.03% of Nb, 0.003 to 0.020% of Ti, and 0.0010 to 0.0100% of N, the relationships $Mo+5V \geq 0.4\%$ and $2Nb-V \leq 0\%$ being satisfied, and the balance being Fe and incidental impurities.

Preferably, in the high-strength, high-toughness seamless steel pipe used for line pipes of the present invention, when hot rolling is performed on a material for the steel pipe and then quenching and tempering are performed, the difference in yield strength or tensile strength between after tempering at $600°$ C. and after tempering at $650°$ C. is 40 MPa or more.

Preferably, in the high-strength, high-toughness seamless steel pipe used for a line pipe, the yield strength, the tensile strength, and the 50% fracture appearance transition temperature in a Charpy impact test for the steel pipe which is hot rolled, quenched, and tempered have the following characteristic values:

YS (yield strength) $\geq 551$ MPa
TS (tensile strength): 620 to 827 MPa
vTrs (base metal) $\leq -60°$ C.
vTrs (welded joint HAZ: 1 mm from fusion line) $\leq -40°$ C.

In another aspect of the present invention, a method for producing a high-strength, high-toughness seamless steel pipe used for a line pipe, a material for the steel pipe being a steel containing 0.03 to 0.06% of C, 0.05 to 0.15% of Si, 1.6 to 2.0% of Mn, 0.010 to 0.10% of Al, 0.3 to 0.7% of Ni, 0.10 to 0.40% of Mo, 0.01 to 0.06% of V, 0.003 to 0.03% of Nb, 0.003 to 0.020% of Ti, and 0.0010 to 0.0100% of N, the relationships $Mo+5V \geq 0.4\%$ and $2Nb-V \leq 0\%$ being satisfied, and the balance being Fe and incidental impurities, the method including the steps of:

heating the material for the steel pipe to the $AC_3$ point or higher;
making a pipe by hot rolling; and then either
(i) performing direct quenching (DQ) of the pipe for cooling the pipe to the Ms point or lower immediately after the pipe-making step, followed by tempering at a temperature lower than the $Ac_1$ point, or
(ii) cooling the pipe by air to the vicinity of room temperature, and performing reheating quenching (RQ) of the pipe for reheating the pipe to the $Ac_3$ point or higher and cooling the pipe to the Ms point or lower, followed by tempering at a temperature less than the $Ac_1$ point.

Preferably, in the method for producing a high-strength, high-toughness seamless steel pipe used for a line pipe, by hot rolling using the material for the steel pipe having the characteristics in that, when hot rolling is performed, followed by quenching and tempering, the difference in yield strength or tensile strength between after tempering at $600°$ C. and after tempering at $650°$ C. is 40 MPa or more, and after quenching is performed, by changing the tempering temperature, the seamless steel pipe having desired yield strength, tensile strength, and toughness is obtained.

Preferably, the yield strength, the tensile strength, and the 50% fracture appearance transition temperature in a Charpy impact test obtained by the method for producing a high-strength, high-toughness seamless steel pipe used for a line pipe are as follows:

YS (yield strength) $\geq 551$ MPa
TS (tensile strength): 620 to 827 MPa
vTrs (base metal) $\leq -60°$ C.
vTrs (welded joint HAZ: 1 mm from junction) $\leq -40°$ C.

BEST MODE FOR CARRYING OUT THE INVENTION

The reasons for specifying the limits in chemical compositions of steel in the present invention will be described below.

C: 0.03 to 0.06%

C is an important element affecting the strength of the steel. The C content must be 0.03% or more in order to improve hardenability so that grade X80 strength is ensured. If the C content exceeds 0.06%, the steel becomes more susceptible to weld-cracking. Therefore, the C content is set at 0.03 to 0.06%.

Si: 0.05 to 0.15%

Si is necessary as a deoxidizer in steelmaking and for increasing strength. If the Si content is less than 0.05%, the effects thereof are insufficient. If the Si content exceeds 0.15%, the toughness in the base metal and HAZ, and weldability are degraded. Therefore, the Si content is set at 0.05 to 0.15%.

Mn: 1.6 to 2.0%

Mn is necessary for increasing hardenability to obtain higher strength, and Mn also improves the toughness in the base metal and HAZ. If the Mn content is less than 1.6%, it is difficult to obtain such effects, and if the Mn content exceeds 2.0%, the effects are saturated. Therefore, the Mn content is set at 1.6 to 2.0%.

Al: 0.010 to 0.10%

Al acts as a deoxidizer in steelmaking and also refines grains by combining with N to form AlN, thereby improving toughness. In order to obtain such an effect, the Al content must be 0.010% or more. However, if the Al content exceeds 0.070%, the number of $Al_2O_3$-based inclusions increases, thereby degrading toughness, and surface defects may occur. Therefore, the Al content is set at 0.010 to 0.10%. Furthermore, in view of securing stable surface quality, the Al content is preferably set at 0.010 to 0.050%.

Ni: 0.3 to 0.7%

Ni improves toughness in the base metal and HAZ. The effect thereof is exhibited by addition of 0.3% or more of Ni. However, even if the Ni content exceeds 0.7%, the effect of improving toughness and corrosion resistance is saturated, resulting in an increase in costs, which is disadvantageous. Therefore, the Ni content is set at 0.3 to 0.7%.

Mo: 0.10 to 0.40%

Addition of Mo is essential for improving hardenability and hardening solid solution, and in order to exert the effect thereof, the Mo content must be 0.10% or more. If the Mo content exceeds 0.40%, toughness in the welded joint is particularly degraded. Therefore, the Mo content is set at 0.10 to 0.40%.

V: 0.01 to 0.06%

Addition of V is essential because V is precipitated as carbonitrides in the matrix, thereby optimizing resistance to temper softening. If the V content exceeds 0.06%, toughness in the welded joint, in particular, is degraded. Therefore, the V content is limited to 0.06% or less.

The reason for setting the lower limit at 0.01% is that if the V content is less than 0.01%, it is not possible to increase strength by the precipitation of carbonitrides.

Nb: 0.003 to 0.03%

Addition of Nb is essential because Nb is precipitated as carbonitrides in the matrix, thereby optimizing resistance to temper softening. If the Nb content exceeds 0.03%, resistance to temper softening becomes excessive. Therefore, the Nb content is limited to 0.03% or less.

The reason for setting the lower limit at 0.003% is that if the Nb content is less than 0.003%, it is not possible to increase strength by the precipitation of carbonitrides.

Ti: 0.003 to 0.020%

Ti refines grains by forming carbides, thereby improving toughness, and also precipitates in the matrix to increase strength, thereby contributing to higher strength. The effects thereof are exhibited by addition of 0.003% or more of Ti. However, if the Ti content exceeds 0.020%, it is difficult to ensure hardenability, and toughness is degraded. Therefore, the Ti content is set at 0.003 to 0.020%, and more preferably, at 0.010 to 0.018%.

N: 0.0010 to 0.0100%

The N content must be 0.0010% or more in order to form AlN and carbonitrides of V and Nb. However, if the N content exceeds 0.0100%, toughness in the HAZ is degraded. Therefore, the N content is set at 0.0010 to 0.0100%, and more preferably, at 0.0030 to 0.0080%.

Mo+5V≧0.4%

Even if the contents of the individual ingredient elements are within the ranges described above, if the sum of the Mo content and 5 times the V content is less than 0.4%, hardenability will be insufficient and it will be difficult to ensure grade X80 strength. Therefore, the Mo content and the V content must satisfy the relationship Mo+5V≧0.4%.

2Nb−V≦0%

Even if the contents of the individual ingredient elements are within the ranges described above, if a difference between 2 times the Nb content and the V content exceeds 0%, resistance to temper softening becomes excessive, and it is difficult to adjust strength by only changing tempering conditions without regard to the size. Therefore, the Nb content and the V content must satisfy the relationship 2Nb−V≦0%.

In addition, although P, S, and O are contained as incidental impurities, in view of ensuring the toughness of the base metal, the contents thereof are preferably reduced where possible. Additionally, P, S, and O are permissible up to contents of 0.03%, 0.01%, and 0.01%, respectively.

Next, a preferred production process for a steel pipe of the present invention will be described.

Steel having the composition described above is melted in a converter or an electric furnace, and molten steel is solidified by a continuous casting method or an ingot casting method to obtain a cast slab. During the above process, ladle refining, vacuum degassing, etc., may be performed on the molten steel as necessary. The obtained cast slab itself is treated as a material for the steel pipe or is further subjected to hot rolling to form a material for the steel pipe.

The material for the steel pipe is heated to $Ac_3$ point or higher, and a seamless steel pipe is made by hot rolling, such as a plug mill process or a mandrel mill process, and then, optionally, the pipe is formed into a desired size while being in the hot state using a sizer or a stretch reducer.

After pipe-making is completed, in order to attain a desired strength-toughness balance, heat treatment comprising quenching-tempering (Q-T) is performed. Quenching (Q) may be performed either by direct quenching (DQ) in which, immediately after the pipe is made while the pipe is in the hot state, cooling to the Ms point or lower (approximately 200° C. or lower) is performed, or by reheating quenching (RQ) in which, after the pipe is made, air cooling to the vicinity of room temperature is performed, and then reheating to the γ (austenite) region and cooling to the Ms point or lower are performed. In order to obtain grade X80 strength after Q-T, quenching is performed from the temperature in the γ range, preferably at a cooling rate of 20° C./s or more, and then tempering is performed at the temperature appropriately set in the range below the $Ac_1$ point (preferably, 550° C. or higher). The holding time at the tempering temperature may be appropriately set, and usually, set at approximately 10 to 120 min.

EXAMPLES

Each of the steel having the composition shown in Table 1 was melted in a converter, vacuum degassing treatment was performed, and the molten steel was solidified by a continuous casing method to produce a cast slab. The cast slab thus obtained was subjected to billet rolling to produce a material for a steel pipe. The material for the steel pipe was formed into a seamless steel pipe with an outer diameter of 219 mm and a wall thickness of 11.1 mm using pipe-making equipment of Mannesman-plug mill type. The steel pipe was heat-treated under the conditions shown in Table 2, and hardness after quenching (in the wall thickness central part of a C cross section), tensile characteristics after tempering (according to API5L standard, strength: YS, TS, elongation: El), and vTrs (50% fracture appearance transition temperature) in a Charpy impact test (in which a test piece with 10×10×55 mm taken from the wall thickness central part in the L direction of the steel pipe was notched in the center in the longitudinal direction with a depth of 2 mm) were investigated. Also, using a commercially available grade X80 welding material, a welded joint of a steel pipe connector was produced by TIG welding (voltage 15 V, current 200 A, welding rate 10 cm/mm, and heat input 18 kJ/cm), vTrs in a Charpy impact test in the HAZ (1 mm from the junction) was investigated. The results thereof are shown in Table 2.

In Examples of the present invention, the dependence of strength on tempering temperature is greater than that in Comparative examples. For example, when the tempering temperature was increased from 600° C. to 650° C., the decrease in YS in Steel C and Steel H in Examples of the present invention were 44 MPa and 60 MPa, respectively. In contrast, the decreases in YS in Steel D, Steel E, and Steel I in comparative Examples were 16 MPa, 21 MPa, and 17 MPa, respectively, which were less than half of those in Examples of the present invention. That is, in Examples of the present invention, the resistance to temper softening is more optimized in comparison with Comparative Examples. Therefore, even if hardenability was changed in accordance with the size of the steel pipe, it is possible to easily obtain desired strength by changing the tempering temperature. In Examples of the present invention, a difference in yield strength or tensile strength between after tempering at 600° C. and after tempering at 650° C. is 40 MPa or more.

In Comparative Examples, some steels (Steels F and J) did not have strength as high as grade X80 strength because of insufficient hardenability. In contrast, in Examples of the present invention, all steels had strength as high as grade X80 strength. Moreover, in Comparative Examples, some steels (Steels G and K) had vTrs which did not achieve the target. In contrast, in Examples of the present invention, all steels had vTrs which exceeded the target.

TABLE 1

| Steel | C | Si | Mn | Al | Ni | Mo | V | Nb | Ti | N | Mo+5V | 2nb−V | Remarks |
|---|---|---|---|---|---|---|---|---|---|---|---|---|---|
| A | 0.042 | 0.10 | 1.82 | 0.025 | 0.50 | 0.300 | 0.037 | 0.011 | 0.014 | 0.0045 | 0.485 | −0.015 | Example of present invention |
| B | 0.042 | 0.11 | 1.78 | 0.041 | 0.49 | 0.341 | 0.049 | 0.010 | 0.013 | 0.0047 | 0.586 | −0.029 | Example of present invention |
| C | 0.055 | 0.07 | 1.65 | 0.032 | 0.43 | 0.350 | 0.024 | 0.005 | 0.015 | 0.0076 | 0.470 | −0.014 | Example of present invention |
| D | 0.039 | 0.12 | 1.92 | 0.044 | 0.62 | 0.347 | 0.025 | 0.020 | 0.012 | 0.0065 | 0.472 | 0.015 | Comparative example |
| E | 0.051 | 0.11 | 1.69 | 0.021 | 0.75 | 0.354 | 0.024 | 0.035 | 0.017 | 0.0055 | 0.474 | 0.046 | Comparative example |
| F | 0.045 | 0.12 | 1.66 | 0.027 | 0.52 | 0.210 | 0.025 | 0.005 | 0.012 | 0.0038 | 0.335 | −0.015 | Comparative example |
| G | 0.040 | 0.11 | 1.69 | 0.030 | 0.48 | 0.443 | 0.026 | 0.004 | 0.016 | 0.0043 | 0.573 | −0.018 | Comparative example |
| H | 0.049 | 0.09 | 1.78 | 0.019 | 0.53 | 0.195 | 0.050 | 0.019 | 0.008 | 0.0037 | 0.445 | −0.012 | Example of present invention |
| I | 0.051 | 0.11 | 1.76 | 0.029 | 0.50 | 0.200 | 0.051 | 0.033 | 0.009 | 0.0041 | 0.455 | 0.015 | Comparative example |
| J | 0.048 | 0.12 | 1.88 | 0.038 | 0.43 | 0.080 | 0.049 | 0.000 | 0.010 | 0.0049 | 0.325 | −0.049 | Comparative example |
| K | 0.037 | 0.10 | 1.78 | 0.036 | 0.53 | 0.310 | 0.065 | 0.021 | 0.012 | 0.0068 | 0.635 | −0.023 | Comparative example |

TABLE 2

| No. | Steel | Quenching method | Hardness after quenching (Hv) | Tempering temperature (° C.) | YS* (MPa) | TS* (MPa) | EL* (%) | vTrs * (° C.) | vTrs ** (° C.) | Remarks |
|---|---|---|---|---|---|---|---|---|---|---|
| 1 | A | RQ | 275 | 600 | 585 | 667 | 27.6 | −80 | −70 | Example of present invention |
| 2 | B | DQ | 281 | 620 | 602 | 702 | 26.3 | −75 | −65 | Example of present invention |
| 3 | C | RQ | 271 | 600 | 632 (44) | 710 (41) | 25.6 | −70 | −60 | Example of present invention |
| 4 | | | | 650 | 588 | 669 | 27.8 | −90 | −70 | Example of present invention |
| 5 | D | RQ | 286 | 600 | 628 (16) | 705 (11) | 26.3 | −70 | −55 | Comparative example |
| 6 | | | | 650 | 612 | 694 | 27.1 | −75 | −60 | Comparative example |
| 7 | E | RQ | 275 | 600 | 620 | 703 | 26.7 | −75 | −55 | Comparative example |

TABLE 2-continued

| No. | Steel | Quenching method | Hardness after quenching (Hv) | Tempering temperature (° C.) | YS* (MPa) | TS* (MPa) | EL* (%) | vTrs * (° C.) | vTrs ** (° C.) | Remarks |
|---|---|---|---|---|---|---|---|---|---|---|
|  |  |  |  |  | (21) | (18) |  |  |  |  |
| 8 |  |  |  | 650 | 599 | 685 | 27.3 | −80 | −65 | Comparative example |
| 9 | F | RQ | 248 | 620 | 521 | 598 | 27.3 | −85 | −70 | Comparative example |
| 10 | G | DQ | 271 | 620 | 589 | 665 | 26.9 | −35 | −20 | Comparative example |
| 11 | H | RQ | 270 | 600 | 623 | 701 | 27.4 | −70 | −60 | Example of present invention |
|  |  |  |  |  | (60) | (56) |  |  |  |  |
| 12 |  |  |  | 650 | 563 | 645 | 28.3 | −85 | −70 | Comparative example |
| 13 | I | RQ | 273 | 600 | 628 | 710 | 26.9 | −70 | −60 | Comparative example |
|  |  |  |  |  | (17) | (9) |  |  |  |  |
| 14 |  |  |  | 650 | 611 | 701 | 27.3 | −80 | −65 | Comparative example |
| 15 | J | RQ | 251 | 620 | 534 | 609 | 28.3 | −80 | −65 | Comparative example |
| 16 | K | DQ | 279 | 620 | 631 | 721 | 26.2 | −30 | −10 | Comparative example |

*Base metal, **HAZ, ( ) Decrease in strength due to increase in tempering temperature.

INDUSTRIAL APPLICABILITY

A high-strength, high-toughness seamless steel pipe used for a line pipe of the present invention has grade X80 strength and stable toughness, in which the target strength can be easily attained regardless of the size. Thereby, excellent effects are exhibited in that the compositions of steel pipes of plural sizes can be integrated, resulting in a reduction in costs.

What is claimed is:

1. A high-strength, high-toughness seamless steel pipe used for a line pipe comprising 0.03 to 0.06% of C, 0.05 to 0.15% of Si, 1.6 to 2.0% of Mn, 0.010 to 0.10% of Al, 0.3 to 0.7% of Ni, 0.10 to 0.40% of Mo, 0.01 to 0.06% of V, 0.003 to 0.03% of Nb, 0.003 to 0.020% of Ti, and 0.0010 to 0.0100% of N, the relationships Mo+5V≧0.4% and 2Nb−V≦0% being satisfied, and the balance being Fe and incidental impurities.

2. A high-strength, high-toughness seamless steel pipe used for a line pipe according to claim 1, wherein, when a material for the steel pipe is hot rolled, quenched, and tempered, the difference in yield strength or tensile strength between after tempering at 600° C. and after tempering at 650° C. is 40 MPa or more.

3. A high-strength, high-toughness seamless steel pipe used for a line pipe according to claim 1, wherein the yield strength, the tensile strength, and the 50% fracture appearance transition temperature in a Charpy impact test after a material for the steel pipe is hot rolled, quenched, and tempered, have the following characteristic values:

YS (yield strength)≧551 MPa

TS (tensile strength): 620 to 827 MPa vTrs (base metal)≦−60° C.

vTrs (welded joint HAZ: 1 mm from junction)≦−40° C.

4. A method for producing a high-strength, high-toughness seamless steel pipe used for a line pipe, a material for the steel pipe being a steel comprising 0.03 to 0.06% of C, 0.05 to 0.15% of Si, 1.6 to 2.0% of Mn, 0.010 to 0.10% of Al, 0.3 to 0.7% of Ni, 0.10 to 0.40% of Mo, 0.01 to 0.06% of V, 0.003 to 0.03% of Nb, 0.003 to 0.020% of Ti, and 0.0010 to 0.0100% of N, the relationships Mo+5V≧0.4% and 2Nb−V≦0% being satisfied, and the balance being Fe and incidental impurities, the method comprising the steps of:

heating the material for the steel pipe to the Ac₃ point or higher;

making a pipe by hot rolling;

performing direct quenching (DQ) of the pipe for cooling the pipe to the Ms point or lower immediately after the pipe-making step; and tempering the pipe at a temperature lower than the Ac₁ point.

5. A method for producing a high-strength, high-toughness seamless steel pipe used for a line pipe, a material for the steel pipe being a steel comprising 0.03 to 0.06% of C, 0.05 to 0.15% of Si, 1.6 to 2.0% of Mn, 0.010 to 0.10% of Al, 0.3 to 0.7% of Ni, 0.10 to 0.40% of Mo, 0.01 to 0.06% of V, 0.003 to 0,03% of Nb, 0.003 to 0.020% of Ti, and 0.0010 to 0.0100% of N, the relationships Mo+5V≧0.4% and 2Nb−V≦0% being satisfied, and the balance being Fe and incidental impurities, the method comprising the steps of:

heating the material for the steel pipe to the Ac₃ point or higher;

making a pipe by hot rolling;

air-cooling the pipe to the vicinity of room temperature;

performing reheating quenching (RQ) of the pipe for reheating the pipe to the Ac₃ point or higher and cooling the pipe to the Ms point or lower; and tempering the pipe at a temperature range lower than the Ac₁ point.

6. A method for producing a high-strength, high-toughness seamless steel pipe used for a line pipe according to either claim 4 or 5, wherein, by performing hot rolling using the material for the steel pipe having the characteristics in that, when hot rolling is performed, followed by quenching and tempering, the difference in yield strength or tensile strength between after tempering at 600° C. and after tempering at 650° C. is 40 MPa or more, and after quenching is performed, by changing the tempering temperature, the seamless steel pipe having desired yield strength, tensile strength, and toughness is obtained.

7. A method for producing a high-strength, high-toughness seamless steel pipe used for a line pipe according to any one of claims 4 to 6, wherein the yield strength, the tensile strength, and the 50% fracture appearance transition temperature in a Charpy impact test obtained by said method are as follows:

YS (yield strength)≧551 MPa

TS (tensile strength): 620 to 827 MPa vTrs (base metal)≦−60° C.

vTrs (welded joint HAZ: 1 mm from junction)≦−40° C.

* * * * *

UNITED STATES PATENT AND TRADEMARK OFFICE
CERTIFICATE OF CORRECTION

PATENT NO.    : 6,540,848 B2
DATED         : April 4, 2003
INVENTOR(S)   : Miyata et al.

It is certified that error appears in the above-identified patent and that said Letters Patent is hereby corrected as shown below:

Column 6,
Table 1, at "Mo", at "Steel G", please change "0.443" to -- 0.443 --, and at "Steel J", please change "0.080" to -- 0.080 --; at "V", at "Steel K", please change "0.065" to -- 0.065 --; at "Nb", at "Steel E", please change "0.035" to -- 0.035 --, at "Steel I", please change "0.033" to -- 0.033 --, and at "Steel J", please change "0.000" to -- 0.000 --, at "Mo+5V", at "Steel F", please change "0.335" to -- 0.335 --, at "Steel J", please change "0.325" to -- 0.325 --; at "2nb-V", at "Steel D", please change "0.015" to -- 0.015 --, and at "Steel I", please change "0.015" to -- 0.015 --.

Column 7,
Table 2-continued, at "Hardness" after "quenching", at "No. 9", please change "248" to -- 248 --, and at "No. 15", please change "251" to -- 251 --; and at "Ys* (MPa)", at "No. 9", please change "521" to -- 521 --, and at "No. 15", please change "534" to -- 534 --.

Column 8,
Line 30, please change "0,03%" to -- 0.03% --.

Signed and Sealed this

First Day of June, 2004

JON W. DUDAS
*Acting Director of the United States Patent and Trademark Office*